United States Patent
Gao et al.

(10) Patent No.: US 12,328,445 B2
(45) Date of Patent: Jun. 10, 2025

(54) DYNAMIC MOTION ESTIMATION PARAMETER MODIFICATION FOR VIDEO ENCODING

(71) Applicant: ATI TECHNOLOGIES ULC, Markham (CA)

(72) Inventors: Wei Gao, Markham (CA); Ihab Amer, Markham (CA); Haibo Liu, Markham (CA); Gabor Sines, Markham (CA); Feng Pan, Markham (CA); Crystal Sau, Markham (CA); Dong Liu, Markham (CA); Minghao Zhu, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 61 days.

(21) Appl. No.: 18/215,897

(22) Filed: Jun. 29, 2023

(65) Prior Publication Data
US 2025/0008149 A1  Jan. 2, 2025

(51) Int. Cl.
 *H04N 19/53* (2014.01)
(52) U.S. Cl.
 CPC .................................. *H04N 19/53* (2014.11)

(58) Field of Classification Search
 CPC ........................... H04N 19/53; H04N 19/533
 See application file for complete search history.

(56) References Cited

U.S. PATENT DOCUMENTS

| | | | |
|---|---|---|---|
| 6,504,850 B1 * | 1/2003 | Kato | H04J 3/1688 |
| | | | 375/E7.157 |
| 2009/0289945 A1 * | 11/2009 | Peterfreund | G06T 15/005 |
| | | | 345/419 |
| 2012/0195356 A1 * | 8/2012 | Yi | H04N 19/156 |
| | | | 375/240.03 |
| 2018/0310009 A1 * | 10/2018 | Kopietz | H04L 65/70 |
| 2021/0092439 A1 * | 3/2021 | Ikai | H04N 19/105 |
| 2021/0344918 A1 * | 11/2021 | Luo | H04L 65/70 |

* cited by examiner

*Primary Examiner* — Mohammed S Rahaman

(57) ABSTRACT

To leverage an amount of unused bandwidth at a hardware encoder to generate motion estimation data, a processing unit includes a hardware encoder configured to perform a first encoding job including encoder sessions to encode a captured frame, determine motion estimation data for a rendered frame, and encode the rendered frame. Further, the processing unit includes a pre-processing circuitry configured to determine a set of motion estimation parameters based on an encoder delay associated with the performance of the first encoding job by the hardware encoder. The hardware encoder is then configured to perform a second encoding job using the determined set of motion estimation parameters.

20 Claims, 5 Drawing Sheets

DYNAMIC MOTION ESTIMATION PARAMETER MODIFICATION FOR VIDEO ENCODING

BACKGROUND

Some processing systems are configured to execute applications that provide encoded streams representing two or more video streams to client systems. To produce these encoded streams, a processing system typically includes an encoder configured to encode a first set of frames from a first source and a second set of frames from a second source. Additionally, to help the encoding of these frames, some processing systems are configured to perform motion estimation techniques to generate motion estimation data and use the generated motion estimation data to encode one or more of the frames. However, performing these motion estimation techniques increases the amount of time needed to encode the sets of video frames, increasing the likelihood of delays or losses in the encoded streams provided to the client systems.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
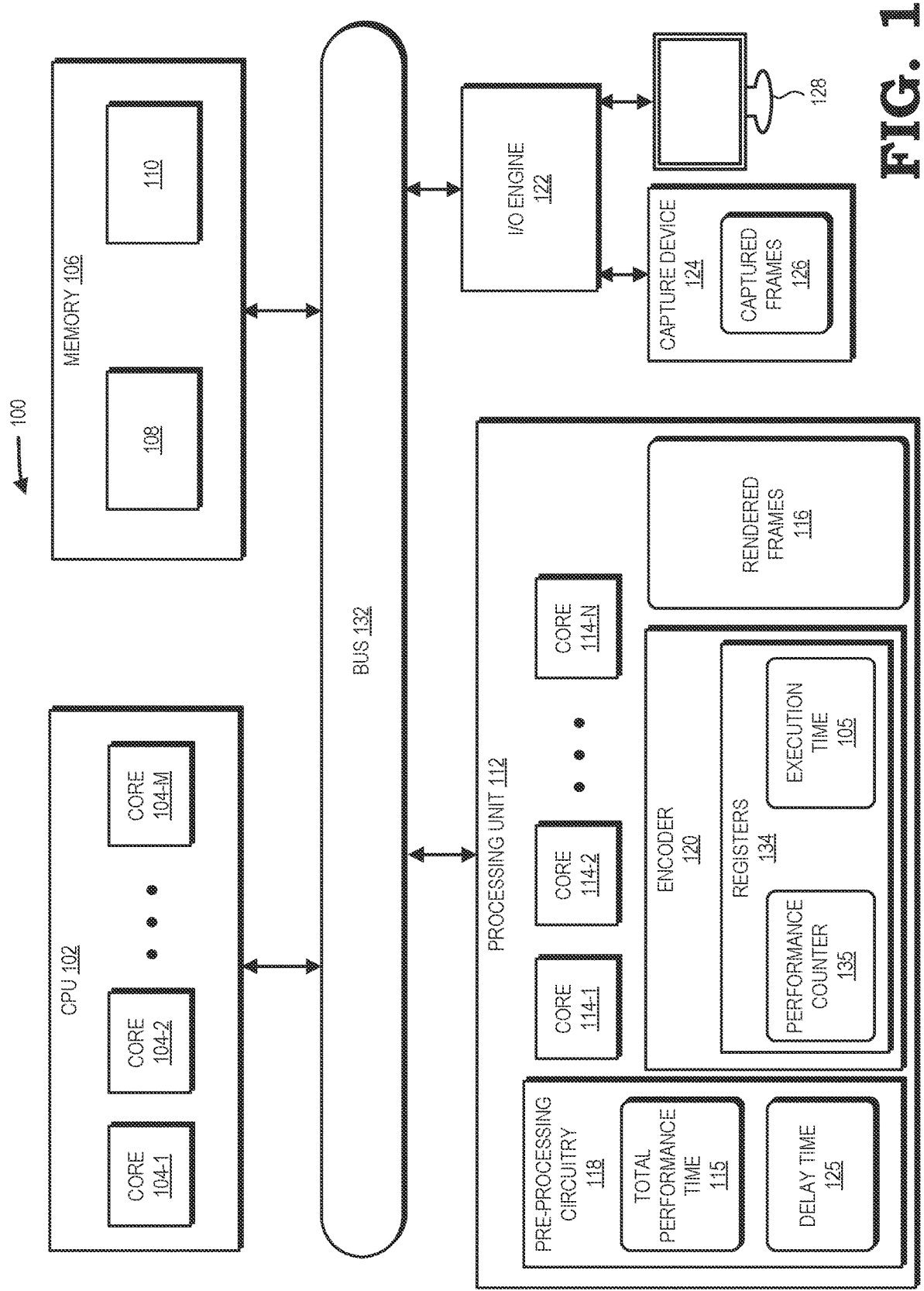
FIG. 1 is a block diagram of a processing system configured to generate an encoded bitstream using dynamic motion estimation parameter modification, in accordance with some embodiments.

Some processing systems are configured to execute applications, such as screen-casting and live-streaming applications, which generate one or more encoded bitstreams representing frames rendered by a processing unit and video frames captured by a capture device. To support these applications, a processing system includes a processing unit configured to render and display a set of rendered frames based on video applications being executed by the processing system. Additionally, the processing system includes a capture device, such as a camera or the like, configured to capture a set of captured frames while the set of rendered frames is displayed. The processing unit then provides the set of rendered frames and the set of captured frames to an encoder configured to encode the set of rendered frames and the set of captured frames so as to produce one or more encoded bitstreams. After generating the encoded bitstreams, the processing unit then stores the encoded bitstreams in a storage of the processing system, provides the encoded bitstreams to one or more other processing systems via a network, or both. To help encode the rendered frames, the processing system further includes a pre-processing circuitry configured to perform motion estimation for one or more rendered frames so as to generate motion estimation data. For example, the pre-processing circuitry is configured to provide a downscaled rendered frame and motion estimation parameters to the encoder such that the encoder generates one or more motion vectors for the rendered frame based on the motion estimation parameters. Using the motion vectors, the pre-processing circuitry performs one or more motion estimation techniques to generate motion estimation data. The motion estimation data, for example, includes data representing a relationship between a rendered frame and one or more temporally adjacent game frames, spatially adjacent game frames, or both. Using the motion estimation data, the encoder then encodes the set of rendered frames to produce an encoded bitstream.

When encoding the set of captured frames and the set of rendered frames, the encoder performs one or more encoding jobs that each include encoding one or more captured frames and one or more rendered frames. For example, each encoding job includes one or more captured frame sessions during which the encoder encodes one or more captured frames, one or more rendered frame sessions during which the encoder encodes one or more rendered frames, and one or more motion estimation sessions during which the encoder determines motion vectors for one or more rendered frames. As an example, an encoding job includes a first session during which the encoder encodes a captured frame, a second session during which the encoder determines motion vectors for a rendered frame, and a third session during which the encoder encodes the rendered frame using motion estimation data generated from the motion vectors. Further, the encoder is associated with a predetermined execution time that represents the amount of time the encoder is allotted to perform an encoding job, encode a rendered frame, encode a captured frame, generate motion vectors, or any combination thereof. That is to say, the predetermined execution time represents a target time for the encoder to perform an encoding job, encode a rendered frame, encode a captured frame, determine motion vectors, or any combination thereof.

However, if the encoder performs an encoding job in an amount of time that is less than an associated executed time, the encoder has available bandwidth that goes unused. For example, if the encoder performs an encoding job in an amount of time that is less than an associated execution time, the encoder remains idle for one or more clock cycles until a next encoding job is to be performed, creating unused bandwidth at the encoder and lowering the processing efficiency of the system. To this end, systems and techniques disclosed herein are directed to leveraging unused encoder bandwidth to generate motion estimation data by dynamically adjusting parameters for motion estimation sessions. For example, to perform motion estimation, the pre-processing circuitry first determines a set of initial motion estimation parameters for one or more encoding jobs. Motion estimation parameters, for example, include data indicating inputs, input formats, outputs, output formats, the number of motion estimation sessions to be performed, or any combination thereof for motion estimation (e.g., motion vector generation) during an encoding job. Further, these motion estimation parameters influence the amount of time required by the encoder to perform one or more motion estimation sessions. That is to say, the amount of time needed for the encoder to perform a motion estimation session is based on a set of motion estimation parameters.

Based on the set of initial motion estimation parameters, the encoder performs a first encoding job that includes one or more captured frame sessions, one or more motion estimation sessions, and one or more rendered frame sessions. That is to say, the encoder performs a first set of encoder sessions that includes one or more captured frame sessions, one or more motion estimation sessions, and one or more rendered frame sessions. After performing the first encoding job, the pre-processing circuitry determines a total performance time that represents the amount of time the encoder took to perform the first encoding job. In other words, the pre-processing circuitry determines the total amount of time that elapsed from when the first encoding job was sent to the encoder to when the encoder completed the performance of the first encoding job. The pre-processing circuitry then compares the determined total performance time of the first encoding job to the execution time associated with the encoder. In response to the total performance time being less than the execution time, the pre-processing circuitry determines the unused bandwidth of the encoder during the first encoding job based on the difference between the total performance time and the execution time. Based on the unused bandwidth, the pre-processing circuitry determines a set of motion estimation parameters to reduce the unused bandwidth. For example, the pre-processing circuitry determines a set of motion estimation parameters that increase the amount of time needed for the encoder to perform one or more motion estimation sessions in order to reduce the unused bandwidth.

Additionally, in response to the total performance time being greater than the execution time, the pre-processing circuitry determines an encoder delay has occurred. The encoder delay, for example, includes the encoder performing an encoder job in an amount of time that exceeds the execution time, causing a delay in the performance of one or more subsequent encoding jobs. The pre-processing circuitry then determines the delay time associated with the encoder delay based on the difference between the total performance time and the execution time. Based on the delay time, the pre-processing circuitry determines a set of motion estimation parameters to reduce the delay time, eliminate the encoder delay, or both. For example, the pre-processing circuitry determines a set of motion estimation parameters that decrease the amount of time needed for the encoder to perform one or more motion estimation sessions in order to reduce the delay time, eliminate the encoder delay, or both. In this way, the processing unit dynamically adjusts motion estimation parameters to decrease unused bandwidth, decrease delay times, or both when the encoder performs one or more encoding jobs. By dynamically adjusting motion estimation parameters, the processing unit helps ensure that more of the bandwidth of the encoder is being utilized without introducing delays, which improves encoding and processing efficiency.

FIG. 1 is a block diagram of a processing system 100 configured to encode multiple bitstreams using dynamic motion estimation parameter modification, in accordance with some embodiments. The processing system 100 includes or has access to a memory 106 or other storage component implemented using a non-transitory computer-readable medium, for example, a dynamic random-access memory (DRAM). However, in implementations, the memory 106 is implemented using other types of memory including, for example, static random-access memory (SRAM), nonvolatile RAM, and the like. According to implementations, the memory 106 includes an external memory implemented external to the processing units implemented in the processing system 100. The processing system 100 also includes a bus 132 to support communication between entities implemented in the processing system 100, such as the memory 106. Some implementations of the processing system 100 include other buses, bridges, switches, routers, and the like, which are not shown in FIG. 1 in the interest of clarity.

In embodiments, processing system 100 is configured to execute one or more streaming applications 108 stored in memory 106 that generate one or more encoded bitstreams that represent rendered frames and video frames captured while the rendered frames are rendering. For example, streaming applications 108 generate an encoded bitstream that represents rendered game frames and video of a user interacting with the rendered game frames. The streaming applications 108 include, for example, screen-casting applications, live-streaming applications, and the like. To help support the execution of these streaming applications 108, processing system 100 includes processing unit 112. Processing unit 112 includes, for example, vector processors, coprocessors, graphics processing units (GPUs), general-purpose GPUs (GPGPUs), accelerated processing units (APUs), non-scalar processors, highly parallel processors, artificial intelligence (AI) processors, inference engines, machine learning processors, other multithreaded processing units, scalar processors, serial processors, or any combination thereof.

To support a streaming application 108, processing unit 112 is configured to render a set of rendered frames 116 according to one or more video applications 110 stored, for example, in memory 106. These video applications 110, for example, include video gaming applications, presentation applications, video conference applications, or any combination thereof, to name a few. A set of rendered frames 116, for example, includes one or more frames each representing at least a portion of a virtual environment (e.g., presentation environment, gaming environment) associated with a video application 110. According to embodiments, to generate the set of rendered frame 116, processing unit 112 renders objects (e.g., graphics objects) based on one or more video applications 110 to produce pixel values (e.g., YUV pixel values) that are then used to generate a rendered frame 116. As an example, the pixel values are saved in a data structure so as to produce a rendered frame 116. In embodiments, after rendering a rendered frame 116, processing unit 112 is configured to display the rendered frame 116 on display 128. To help render the objects for a rendered frame 116, processing unit 112 implements a plurality of processor cores 114-1 to 114-N that execute instructions concurrently or in parallel. For example, processing unit 112 executes instructions from a video application 110 using a plurality of processor cores 114 to render one or more objects. According to implementations, one or more processor cores 114 operate as SIMD units that perform the same operation on different data sets. Though in the example implementation illustrated in FIG. 1, three processor cores (114-1, 114-2, 114-N) are presented representing an N number of processor cores, the number of processor cores 114 implemented in processing unit 112 is a matter of design choice. As such, in other implementations, processing unit 112 can include any number of processor cores 114.

Further, in embodiments, to help support streaming applications 108, processing system 100 includes capture device 124. Capture device 124 includes, for example, a device configured to capture video, audio, pictures, or any combination thereof. As an example, a capture device 124 includes a camera, video camera, microphone, or any combination thereof. According to embodiments, capture device 124 is configured to capture a set of captured frames 126 while processing unit 112 is displaying one or more rendered frames 116 on display 128. A set of captured frames 126, for example, includes one or more video frames captured while processing unit 112 renders and displays one or more rendered frames 116. As an example, capture device 124 is configured to capture video frames (e.g., captured frames 126) of a user interacting with the rendered frames 116 displayed on display 128. In some embodiments, processing system 100 includes input/output (I/O) engine 122 that includes circuitry to handle input or output operations associated with the capture device 124 and display 128, as well as other elements of the processing system 100 such as keyboards, mice, printers, external disks, and the like. The I/O engine 122 is coupled to the bus 132 so that the I/O engine 122 communicates with the memory 106, processing unit 112, or the central processing unit (CPU) 102.

The processing system 100 also includes CPU 102 that is connected to the bus 132 and therefore communicates with processing unit 112 and the memory 106 via the bus 132. CPU 102 implements a plurality of processor cores 104-1 to 104-N that execute instructions concurrently or in parallel. In implementations, one or more of the processor cores 104 operate as SIMD units that perform the same operation on different data sets. Though in the example implementation illustrated in FIG. 1, three processor cores (104-1, 104-2, 104-M) are presented representing an M number of cores, the number of processor cores 104 implemented in the CPU 102 is a matter of design choice. As such, in other implementations, the CPU 102 can include any number of processor cores 104. In some implementations, the CPU 102 and processing unit 112 have an equal number of processor cores 104, 114 while in other implementations, CPU 102 and processing unit 112 have a different number of processor cores 104, 114. The processor cores 104 execute instructions such as program code for one or more streaming applications 108, video applications 110, or both stored in the memory 106, and CPU 102 stores information in the memory 106 such as the results of the executed instructions. CPU 102 is also able to initiate graphics processing by issuing draw calls to processing unit 112.

To generate one or more encoded bitstreams, processing unit 112 includes encoder 120. Encoder 120, for example, includes a hardware-based encoder, software-based encode, or both configured to encode one or more rendered frames 116, captured frames 126, or both. As an example, encoder 120 is configured to encode one or more rendered frames 116, captured frames 126, or both based on, for example, a codec (e.g., AOMedia Video 1 (AV1), VP9, H.264 (Advanced Video Coding (AVC), H.265 (High Efficiency Video Coding (HEVC), H.266 (Versatile Video Coding (VVC)). To encode a rendered frame 116, captured frame 126, or both, encoder 120 is configured to compare a rendered frame 116, captured frame 126, or both to one or more reference frames to determine one or more compressed pixel values. Encoder 120 uses these compressed pixel values generated from a rendered frame 116 or captured frame 126 to generate an encoded frame. Encoder 120 then stores the encoded frame with one or more other encoded frames to produce an encoded bitstream. In some embodiments, encoder 120 is configured to produce respective encoded bit streams for rendered frames 116 and captured frames 126. That is to say, in some embodiments, encoder 120 is configured to generate a first encoded bitstream representing encoded rendered frames 116 and a second encoded bitstream representing encoded captured frames 126. In other embodiments, encoder 120 is configured to generate a single encoded bitstream representing the encoded rendered frames 116 and the encoded captured frames 126. After generating one or more encoded bitstreams, encoder 120 stores the encoded bitstreams in a storage (e.g., not shown for clarity), transmits, via a network, the encoded bitstreams to another processing system, or both.

To help encode rendered frames 116, processing unit 112 includes pre-processing circuitry 118. Pre-processing circuitry 118 includes circuitry configured to perform one or more pre-analysis techniques, for example, motion estimation techniques, temporal adaptive quantization (AQ) techniques, spatial AQ techniques, and the like. For example, pre-processing circuitry 118 is configured to perform motion estimation techniques (e.g., block matching) for one or more rendered frames 116 to be encoded so as to produce motion estimation data. The motion estimation data, for example, includes data indicating a relationship between a rendered frame 116 and one or more temporally adjacent frames, one or more spatially adjacent frames, or both. As an example, motion estimation data includes data indicating motion hints, motion vectors, or both. According to embodiments, to perform one or more pre-analysis techniques, for example, pre-processing circuitry 118 is first configured to downscale a rendered frame 116 from a first resolution to a second resolution that is lower than the first resolution. The pre-processing circuitry 118 then provides the downscaled rendered frame 116 and a set of motion estimation parameters to encoder 120. These motion estimation parameters provided to encoder 120 include, for example, one or more quantization parameters (QPs), motion vector precision (e.g., half pixel, quarter pixel), or the like. Based on the set of motion estimation parameters and the downscaled rendered frame 116, encoder 120 then performs one or more motion estimation techniques to determine one or more motion vectors. For example, based on the set of motion estimation parameters, encoder 120 compares the downscaled rendered frame 116 to one or more reference frames (e.g., temporally adjacent reference frames, spatially adjacent reference frames). Based on the comparison, encoder 120 then generates a map of motion vectors that indicate, for example, the translational motion in the rendered frame 116. After generating the motion vectors based on a rendered frame 116, encoder 120 provides these motion vectors to pre-processing circuitry 118. Pre-processing circuitry 118 then performs one or more pre-analysis techniques (e.g., motion estimation techniques) to determine motion estimation data for the rendered frame 116. Based on the determined motion estimation data, encoder 120 encodes one or more rendered frames 116.

In embodiments, to encode one or more rendered frames 116 and one or more captured frames 126, encoder 120 is configured to perform one or more encoding jobs. Each encoding job, for example, includes a set of encoder sessions wherein encoder 120 performs one or more operations to encode a frame, generate motion estimation data, or both. For example, an encoding job includes one or more rendered frame sessions during which encoder 120 encodes a respective rendered frame 116, one or more captured frame sessions during which encoder 120 encodes a respective captured frame 126, and one or more motion estimation sessions during which the encoder 120 generates motion vectors for one or more rendered frames 116. As an example, to encode a rendered frame 116 and a corresponding captured frame 126 (e.g., a captured frame 126 was captured while the rendered frame 116 was displayed on display 128), encoder 120 performs an encoding job that includes a captured frame session during which encoder 120 encodes the captured frame 126, one or more motion estimation sessions during which encoder 120 performs one or more motion estimation techniques to determine one or more motion vectors for the rendered frame 116, and a rendered frame session during which encoder 120 encodes the rendered frame 116 based on motion estimation data determined from the motion vectors. According to some embodiments, encoder 120 is a hardware-based encoder that includes one or more registers 134 that store data indicating an execution time 105. The execution time 105, for example, represents a predetermined amount of time allocated to encoder 120 to perform one or more encoding jobs. That is to say, the execution time 105, as an example, represents a target time for encoder 120 to perform an encoding job.

In the event that encoder 120 performs an encoding job in an amount of time that is less than an associated execution time 105, encoder 120 has available bandwidth that goes unused. That is to say, if encoder 120 performs an encoding job in an amount of time that is less than an associated execution time 105, encoder 120 remains idle for one or more clock cycles until a next encoding job is to be performed, creating unused bandwidth at encoder 120 and lowering the processing efficiency of processing system 100. To this end, to help reduce unused bandwidth at encoder 120, Pre-processing circuitry 118 is configured to dynamically adjust motion estimation parameters for the motion estimation sessions of one or more encoding jobs. As an example, in some embodiments, Pre-processing circuitry 118 is configured to first generate a set of initial motion estimation parameters for one or more encoding jobs. These motion estimation parameters, for example, include data indicating inputs for motion estimation, input formats for motion estimation, outputs for motion estimation, output formats for motion estimation, a number of motion estimation sessions to be performed, or any combination thereof for motion estimation during an encoding job. For example, the motion estimation parameters indicate a downscaling resolution (e.g., a resolution to which an input rendered frame 116 is to be downscaled), one or more reference frames, one or more QPs, motion vector precision (e.g., half pixel, quarter pixel), output grid size (e.g., 8×8 pixels, 16×16 pixels), output type (e.g., motion vector, R-D intra cost, R-D inter cost), a number of motion estimation sessions to be performed, or any combination thereof. According to embodiments, these motion estimation parameters influence the amount of time required for encoder 120 to perform one or more motion estimation sessions during an encoding job. That is to say, the amount of time needed for encoder 120 to perform one or more motion estimation sessions during an encoding job is based on a set of motion estimation parameters.

Using the set of initial motion estimation parameters, encoder 120 performs a first encoding job (e.g., plurality of encoder sessions) that includes one or more captured frame sessions, one or more motion estimation sessions, and one or more rendered frame sessions. In embodiments, while performing an encoding job, encoder 120 is configured to track the number of clock cycles spent performing a rendered frame session (e.g., encoding a rendered frame 116), performing a captured frame session (e.g., encoding a captured frame 126), performing a motion estimation session (e.g., determining motion vectors for a rendered frame 116), performing an encoding job, or any combination thereof. To this end, encoder 120 includes one or more performance counters 135 stored in registers 134. A performance counter 135, for example, includes data indicating the number of clock cycles the encoder spent performing a rendered frame session, performing a captured frame session, performing a motion estimation session, performing an encoding job, or any combination thereof. As an example, while performing a session (e.g., rendered frame session, captured frame session, motion estimation session), encoder 120 is configured to increment one or more performance counters for each clock cycle that occurs during the performance of the session. In this way, the performance counters 135 indicate the number of clock cycles that passed while encoder 120 was performing an encoding job. For example, while performing the first encoding job, encoder 120 updates one or more performance counters 135 such that the performance counters 135 indicate the number of clock cycles that elapsed while encoder 120 performed the first encoding job.

In embodiments, once encoder 120 has completed the performance of the first encoding job, pre-processing circuitry 118 determines a total performance time 115 that represents the amount of time encoder 120 spent performing the first encoding job. That is to say, total performance time 115 represents the amount of time between encoder 120 receiving the first encoding job and encoder 120 making one or more results (e.g., data, encoded rendered frames 116, encoded captured frames 126) from the first encoding job available (e.g., storing the results in memory 106, a buffer, a queue, or any combination thereof). According to some embodiments, pre-processing circuitry 118 determines the total performance time 115 based on the number of clock cycles indicated in one or more performance counters 135. After determining the total performance time 115, pre-processing circuitry 118 then compares the total performance time 115 to the execution time 105 associated with encoder 120 to determine whether there was unused bandwidth at encoder 120 during the performance of the first encoding job or there was an encoder delay at the encoder 120 during the performance of the first encoding job.

As an example, in response to the total performance time 115 being equal to the execution time 105, pre-processing circuitry 118 determines that there was no unused bandwidth or encoder delay at encoder 120 during the performance of the first encoding job. Based on there being no unused bandwidth or delay at encoder 120 during the performance of the first encoding job, pre-processing circuitry 118 uses the initial set of motion estimation parameters for a second encoding job (e.g., second set of encoder sessions). Further, in response to the total performance time 115 being less than the execution time 105, pre-processing circuitry 118 determines there was unused bandwidth at encoder 120 during the performance of the first encoding job. Pre-processing circuitry 118 then determines the amount of unused bandwidth based on the difference between the total performance time 115 and the execution time 105. Using the determined amount of unused bandwidth, pre-processing circuitry 118 determines a set of motion estimation parameters so as to reduce the unused bandwidth. For example, pre-processing circuitry 118 determines a set of motion estimation parameters that increase the amount of time needed for encoder 120 to perform one or more motion estimation sessions in order to generate motion estimation data for more frames by leveraging the amount of unused bandwidth.

Additionally, in response to the total performance time 115 being greater than the execution time 105, pre-processing circuitry 118 determines that there was an encoder delay at encoder 120 while performing the first encoding. This encoder delay, for example, includes encoder 120 performing the first encoder job in an amount of time that exceeds the execution time 105, causing a delay in the performance of one or more subsequent encoding jobs by encoder 120. After determining an encoding delay occurred, pre-processing circuitry 118 then determines a delay time 125 associated with the encoder delay based on the difference between the total performance time 115 and the execution time 105. Based on the delay time 125, pre-processing circuitry 118 determines a set of motion estimation parameters so as to reduce the delay time 125, eliminate the encoder delay, or both. As an example, pre-processing circuitry 118 determines a set of motion estimation parameters that decrease the amount of time needed for the encoder to perform one or more motion estimation sessions so as to reduce the delay time 125, eliminate the encoder delay, or both. In this way, pre-processing circuitry 118 dynamically adjusts motion estimation parameters to decrease unused bandwidth, decrease delay times 125, or both when encoder 120 performs one or more encoding jobs. By dynamically adjusting motion estimation parameters in this manner, pre-processing circuitry 118 helps ensure that more of the bandwidth of encoder 120 is being utilized without introducing encoder delays and helps improve the encoding and processing efficiency of processing system 100.

Figure 2:
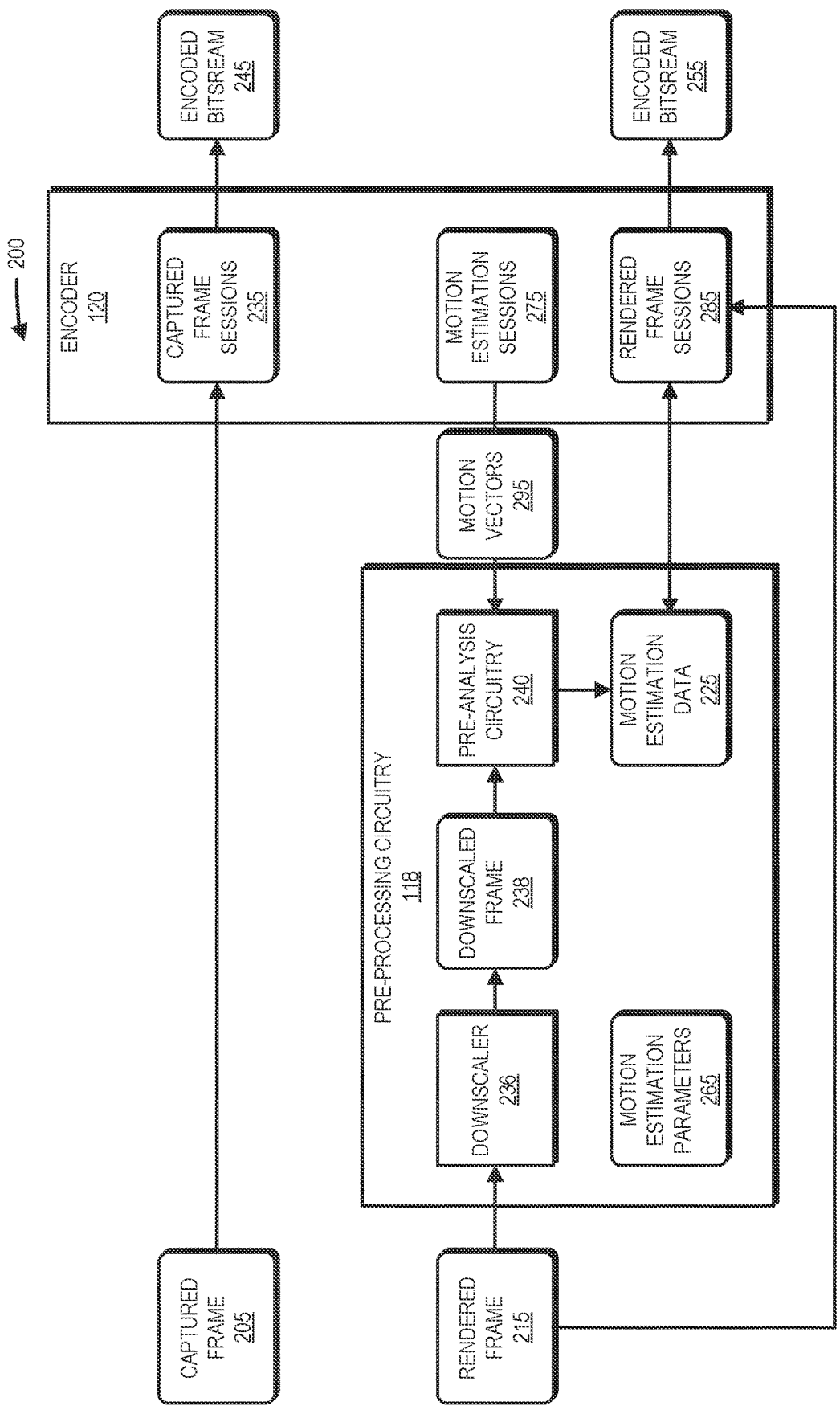
FIG. 2 is a block diagram of an encoding system configured to dynamically adjust motion estimation parameters, in accordance with some embodiments.

Referring now to FIG. 2, an encoding system 200 configured to dynamically adjust motion estimation parameters is presented. In embodiments, encoding system 200 is configured to be implemented in processing unit 112 and includes, for example, encoder 120 and pre-processing circuitry 118. According to embodiments, encoding system 200 is configured to perform one or more sets of encoder sessions (e.g., encoding jobs) that each include one or more captured frame sessions 235, one or more motion estimation sessions 275, and one or more rendered frame sessions 285. To perform a set of encoder sessions, in embodiments, encoder 120 is first configured to perform a captured frame session 235 (e.g., a first session) during which encoder 120 is configured to encode a captured frame 205. To this end, encoder 120 is configured to first receive a captured frame 205 from the set of captured frames 126, from, for example, capture device 124. After receiving captured frame 205, encoder 120 then encodes captured frame 205 so as to produce at least a portion of an encoded bitstream 245. For example, encoder 120 encodes captured frame 205 by comparing pixel values (e.g., YUV pixel values) of captured frame 205 to one or more reference frames. Based on the comparison of the pixel values of captured frame 205 to the reference frames, encoder 120 determines one or more compressed pixel values. Encoder 120 then stores the compressed pixel values in a buffer, memory 106, or both so as to produce an encoded captured frame (e.g., a portion of encoded bitstream 245). For example, encoder 120 stores the compressed pixel values (e.g., encoded captured frame) in memory 106, a storage, or both with one or more other encoded captured frames to produce encoded bitstream 245. In embodiments, while performing captured frame session 235, encoder 120 is configured to increment a performance counter 135 for each clock cycle that elapses while encoder 120 performs captured frame session 235.

After performing one or more captured frame sessions 235, encoder 120 is configured to then perform one or more motion estimation sessions 275 during which encoder 120 is configured to generate one or more motion vectors 295 for one or more rendered frames 215. As an example, to have encoder 120 perform a motion estimation session 275, pre-processing circuitry 118 is configured to first receive a rendered frame 215 of the set of rendered frames 116. After receiving the rendered frame 215, pre-processing circuitry 118 downscales the rendered frame 215 based on motion estimation parameters 265. Motion estimation parameters 265, for example, include data indicating inputs for motion estimation, input formats for motion estimation, outputs for motion estimation, output formats for motion estimation, a number of motion estimation sessions to be performed, or any combination thereof for motion estimation during an encoding job. For example, the motion estimation parameters indicate a downscaling resolution (e.g., an input resolution to which rendered frame 215 is to be downscaled), one or more reference frames, one or more QPs, motion vector precision (e.g., half pixel, quarter pixel), output grid size (e.g., 8×8 pixels, 16×16 pixels), output type (e.g., motion vector, R-D intra cost, R-D inter cost), the number of motion estimation sessions to be performed, or any combination thereof. To downscale rendered frame 215, pPre-processing circuitry 118 includes downscaler 236 that includes circuitry configured to downscale rendered frame 215 from a first resolution to a second resolution lower than the first resolution based on motion estimation parameters so as to produce downscaled frame 238. For example, downscaler 236 downscales rendered frame 215 to an input resolution (e.g., downscaling resolution) indicated in motion estimation parameters 265. After generating downscaled frame 238, downscaler 236 provides downscaled frame 238 to pre-analysis circuitry 240.

Pre-analysis circuitry 240 includes, for example, circuitry configured to perform one or more pre-analysis techniques, for example, motion estimation techniques, temporal AQ techniques, spatial AQ techniques, or any combination thereof, to name a few. For example, pre-analysis circuitry 240 is configured to perform one or more motion estimation techniques (e.g., block matching). According to embodiments, in response to receiving downscaled frame 238, pre-analysis circuitry 240 is configured to provide downscaled frame 238 and one or more motion estimation parameters 265 to encoder 120. The motion estimation parameters 265 sent to encoder 120 include, for example, parameters associated with generating one or more motion vectors (e.g., one or more reference frames, one or more QPs, motion vector precision, or any combination thereof). Based on the received motion estimation parameters 265, encoder 120 performs the motion estimation session 275 by determining one or more motion vectors 295 using downscaled frame 238. For example, encoder 120 compares downscaled frame 238 to one or more reference frames indicated in motion estimation parameters 265 to produce one or more motion vectors 295. After determining these motion vectors 295 (e.g., motion vectors associated with rendered frame 215), encoder 120 provides the determined motion vectors 295 to pre-analysis circuitry 240, ending the motion estimation session 275. After receiving the determining motion vectors 295, pre-analysis circuitry 240 performs one or more pre-analysis techniques (e.g., motion estimation techniques) based on the determined motion vectors 295 and motion estimation parameters 265 (e.g., output grid size, output type) to produce motion estimation data 225 (e.g., motion estimation data 225 associated with the rendered frame 215). As an example, pre-analysis circuitry 240 performs block matching based on the determined motion vectors 295 and motion estimation parameters 265 to produce motion estimation data 225. Motion estimation data 225 includes, for example, data indicating a relationship between the rendered frame 215 and one or more temporally adjacent frames, one or more spatially adjacent frames, or both. As an example, motion estimation data 225 includes data indicating motion hints, motion vectors, or both. According to embodiments, while encoder 120 is performing a motion estimation session 275 (e.g., determining motion vectors 295), encoder 120 is configured to increment a performance counter 135 for each clock cycle that elapses while encoder 120 is performing motion estimation session 275.

To perform a rendered frame session 285, encoder 120 is configured to receive the rendered frame 215 and motion estimation data 225 associated with the rendered frame 215 (e.g., motion estimation data 225 generated during the motion estimation session 275 that used the rendered frame 215). Encoder 120 then encodes rendered frame 215 based on the motion estimation data 225 so as to produce at least a portion of an encoded bitstream 255. For example, encoder 120 encodes rendered frame 215 by comparing pixel values (e.g., YUV pixel values) of rendered frame 215 to one or more reference frames. Based on the motion estimation data 225 and the comparison of the pixel values of rendered frame 215 to the reference frames, encoder 120 determines one or more compressed pixel values. Encoder 120 then stores the compressed pixel values in a buffer, memory 106, or both to produce an encoded rendered frame (e.g., a portion of encoded bitstream 255). As an example, encoder 120 stores the compressed pixel values (e.g., encoded captured frame) in memory 106, a storage, or both with one or more other encoded rendered frames to produce encoded bitstream 255. In embodiments, while performing a rendered frame session 285, encoder 120 is configured to increment a performance counter 135 for each clock cycle that elapses while encoder 120 performs rendered frame session 285.

In embodiments, to help limit the amount of unused bandwidth at encoder 120 when an encoding job is performed, Pre-processing circuitry 118 is configured to dynamically adjust motion estimation parameters 265. To this end, after encoding system 200 performs an encoding job including one or more captured frame sessions 235, motion estimation sessions 275, and rendered frame sessions 285, pre-processing circuitry 118 determines the total performance time 115 of the encoding job based on, for example, one or more performance counters 135. Based on the total performance time 115 of the encoding job, pre-processing circuitry 118 then determines whether the total performance time 115 indicates there was unused bandwidth at encoder 120 during the encoding job, there was an encoder delay during the encoding job, or both. For example, pre-processing circuitry 118 compares the total performance time 115 to the execution time 105 associated with encoder 120 to determine whether the total performance time 115 indicates there was unused bandwidth or an encoder delay at encoder 120 during the encoding job.

In response to the total performance time 115 being equal to the execution time 105 associated with encoder 120, pre-processing circuitry 118 determines that there was no unused bandwidth or an encoder delay at encoder 120 during the performance of the encoding job. Because there was no unused bandwidth or an encoder delay at encoder 120, pre-processing circuitry 118 leaves motion estimation parameters 265 unmodified and uses the motion estimation parameters 265 for one or more subsequent encoding jobs (e.g., subsequent sets of encoder sessions). In response to the total performance time 115 being less than the execution time 105 associated with encoder 120, pre-processing circuitry 118 determines that there was unused bandwidth at encoder 120 during the performance of the encoding job. Pre-processing circuitry 118 then determines the amount of unused bandwidth by determining the difference between the total performance time 115 and execution time 105. Based on the determined amount of unused bandwidth, pre-processing circuitry 118 modifies one or more motion estimation parameters 265 so as to increase the time needed for encoder 120 to perform one or more motion estimation sessions 275. For example, based on the determined amount of unused bandwidth, pre-processing circuitry 118 increases the input resolution (e.g., downscaling resolution), increases the number of motion estimation sessions 275, increases the number of reference frames used, increases one or more QPs, increases the motion vector precision, or any combination thereof indicated by motion estimation parameters 265. By increasing the time needed for encoder 120 to perform one or more motion estimation sessions 275, pre-processing circuitry 118 increases the total performance time 115 for one or more subsequent encoding jobs, helping to leverage the amount of unused bandwidth at encoder 120 so as to produce further motion estimation data 225.

In response to the total performance time 115 being greater than the execution time 105 associated with encoder 120, pre-processing circuitry 118 determines that there was an encoder delay at encoder 120 during the performance of the encoding job. That is to say, pre-processing circuitry 118 determines that the performance of the encoding job took longer than the execution time 105, resulting in the delay of the performance of one or more subsequent encoding jobs. Pre-processing circuitry 118 then determines delay time 125 associated with the encoder delay by determining the difference between the total performance time 115 and execution time 105. Based on the determined delay time 125, pre-processing circuitry 118 modifies one or more motion estimation parameters 265 so as to decrease the time needed for encoder 120 to perform one or more motion estimation sessions 275. For example, based on the determined amount of unused bandwidth, pre-processing circuitry 118 decreases the input resolution (e.g., downscaling resolution), decreases the number of motion estimation sessions 275, decreases the number of reference frames used, decreases one or more QPs, decreases the motion vector precision, or any combination thereof indicated by motion estimation parameters 265. By decreasing the time needed for encoder 120 to perform one or more motion estimation sessions 275, pre-processing circuitry 118 decreases the total performance time 115 for one or more subsequent encoding jobs, helping to eliminate encoder delays at encoder 120.

Figure 3:
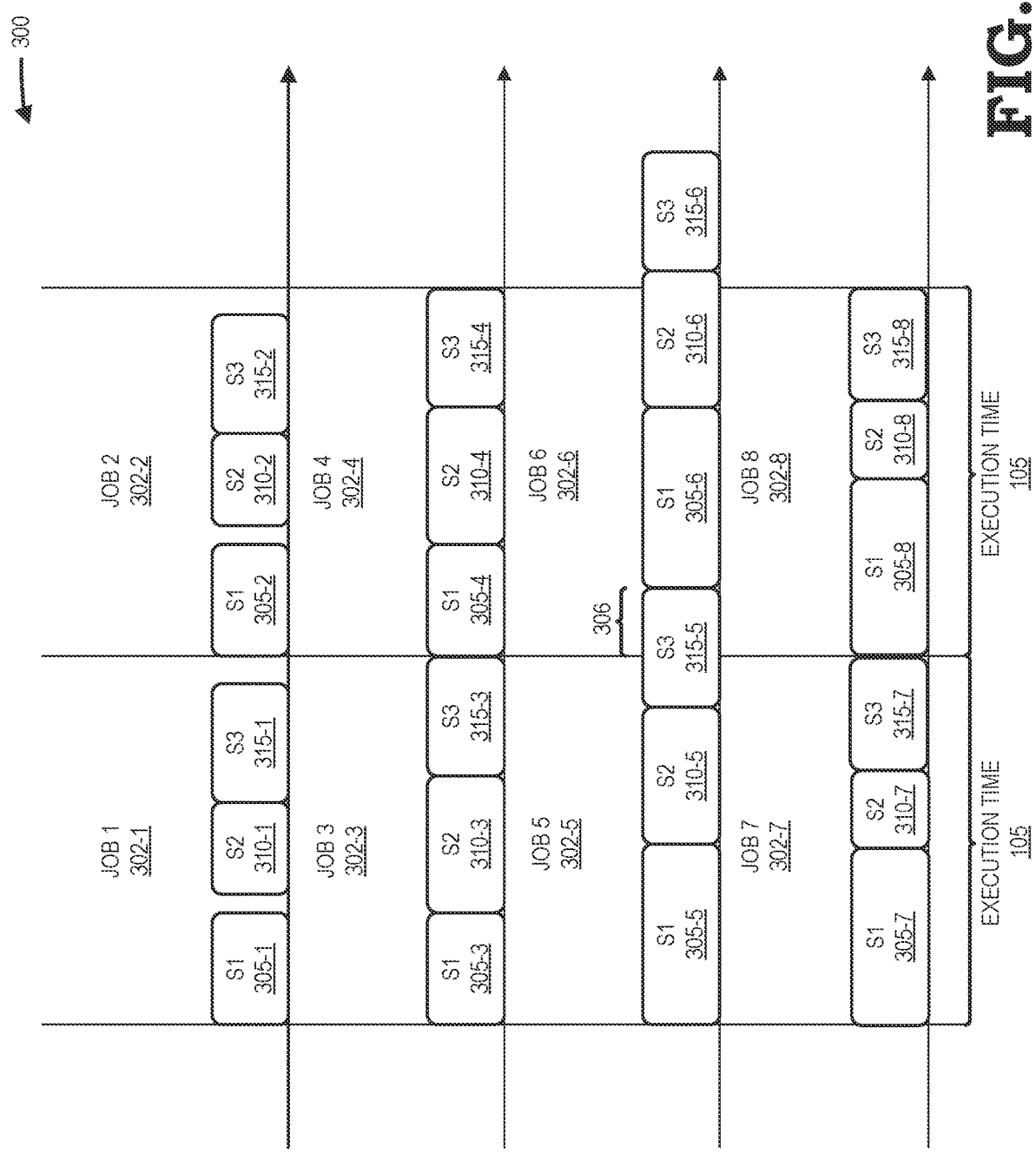
FIG. 3 is an example timing diagram for encoding jobs each having respective sets of motion estimation parameters, in accordance with some embodiments.

Referring now to FIG. 3, an example timing diagram 300 for encoding jobs each having respective sets of motion estimation parameters is presented, in accordance with some embodiments. For example, example timing diagram 300 presents the timings for eight encoding jobs 302 (302-1, 302-2, 302-3, 302-4, 302-5, 302-6, 302-6, 302-7, 302-8) performed by encoder 120 (e.g., a hardware encoder) that each includes a captured frame session 235 (represented in FIG. 3 as sessions S1 305-1, 305-2, 305-3, 305-4, 305-5, 305-6, 305-7, 305-8, respectively), a motion estimation session 275 (represented in FIG. 3 as sessions S2 310-1, 310-2, 310-3, 310-4, 310-5, 310-6, 310-7, 310-8), and a rendered frame session 285 (represented in FIG. 3 as sessions S3 315-1, 315-2, 315-3, 315-4, 315-5, 315-6, 315-7, 315-8). Regarding job 1 302-1, encoder 120 is configured to perform session S1 305-1, S2 305-1, and S3 310-1 based on a first set of motion estimation parameters 265. As demonstrated by example timing diagram 300, the amount of time for encoder 120 to perform job 1 302-1 (e.g., total performance time 115 of job 1 302-1) is less than the execution time 105 associated with encoder 120. Because the amount of time for encoder 120 to perform job 1 302-1 is less than the execution time 105 associated with encoder 120, no encoder delay is introduced when encoder 120 performs job 2 302-2. That is to say, because the amount of time for encoder 120 to perform job 1 302-1 is less than the execution time 105 associated with encoder 120, encoder 120 is able to begin performing job 2 302-2 during a next period of execution time 105. However, timing diagram 300 demonstrates that the amount of time for encoder 120 to perform job 1 302-1 is greater than the execution time 105 associated with encoder 120, indicating that there is unused bandwidth at encoder 120. Based on the unused bandwidth, pre-processing circuitry 118 modifies one or more motion estimation parameters 265 of the set of motion estimation parameters 265 used to perform job 1 302-1 so as to increase the amount of time needed for encoder 120 to perform a motion estimation session 275 for a subsequent encoding job 302.

Such a modification of one or more motion estimation parameters 265 of the set of motion estimation parameters 265 used to perform job 1 302-1 is presented at job 3 302-3 in example timing diagram 300. For example, based on the modification to one or more motion estimation parameters 265, the amount of time needed for encoder 120 to perform session S2 310-3 during job 3 302-3 is increased. By increasing the amount of time needed for encoder 120 to perform session S2 310-3, the total time needed for encoder 120 to perform job 3 302-3 is increased, helping reduce the amount of unused bandwidth at encoder 120. Further, because, as demonstrated by example timing diagram 300, the time needed for encoder 120 to perform job 3 302-3 is equal to execution time 105, no unused bandwidth or encoder delay are indicated. As such, the same set of motion estimation parameters 265 used by encoder 120 to perform job 3 302-3 are again used by encoder 120 to perform job 4 302-4, job 5 302-5, and job 6 302-6.

However, at job 5 302-5, the amount of time needed for encoder 120 to perform session S1 305-5 (e.g., a captured frame session 235) is increased due to, for example, an increase in the complexity of the captured frame 205 being encoded. Due to this increase in the amount of time needed to perform session S1 305-5, the time needed for encoder 120 to perform job 5 302-5 (e.g., the total performance time 115 of job 5 302-5) exceeds execution time 105, resulting in a delay 306 (e.g., delay time 125) before encoder 120 performs job 6 302-6. Due to this delay 306, pre-processing circuitry 118 modifies one or more motion estimation parameters 265 of the set of motion estimation parameters 265 used to perform jobs 5 and 6 302-5, 302-6 so as to decrease the amount of time needed for encoder 120 to perform a motion estimation session 275 for a subsequent encoding job 302. This modification of one or more motion estimation parameters 265 of the set of motion estimation parameters 265 used to perform jobs 5 and 6 302-5, 302-6 is presented at job 7 302-7 in example timing diagram 300. For example, based on the modification to one or more motion estimation parameters 265, the amount of time needed for encoder 120 to perform session S2 310-7 during job 3 302-3 is decreased. By decreasing the amount of time needed for encoder 120 to perform session S2 310-7, the total time needed for encoder 120 to perform job 7 302-7 is decreased, helping eliminate the delay 306. Further, because, as demonstrated by example timing diagram 300, the time needed for encoder 120 to perform job 7 302-7 is equal to execution time 105, no unused bandwidth or encoder delay are indicated. As such, the same set of motion estimation parameters 265 used by encoder 120 to perform job 7 302-7 is again used by encoder 120 to perform job 8 302-8.

Figure 4:
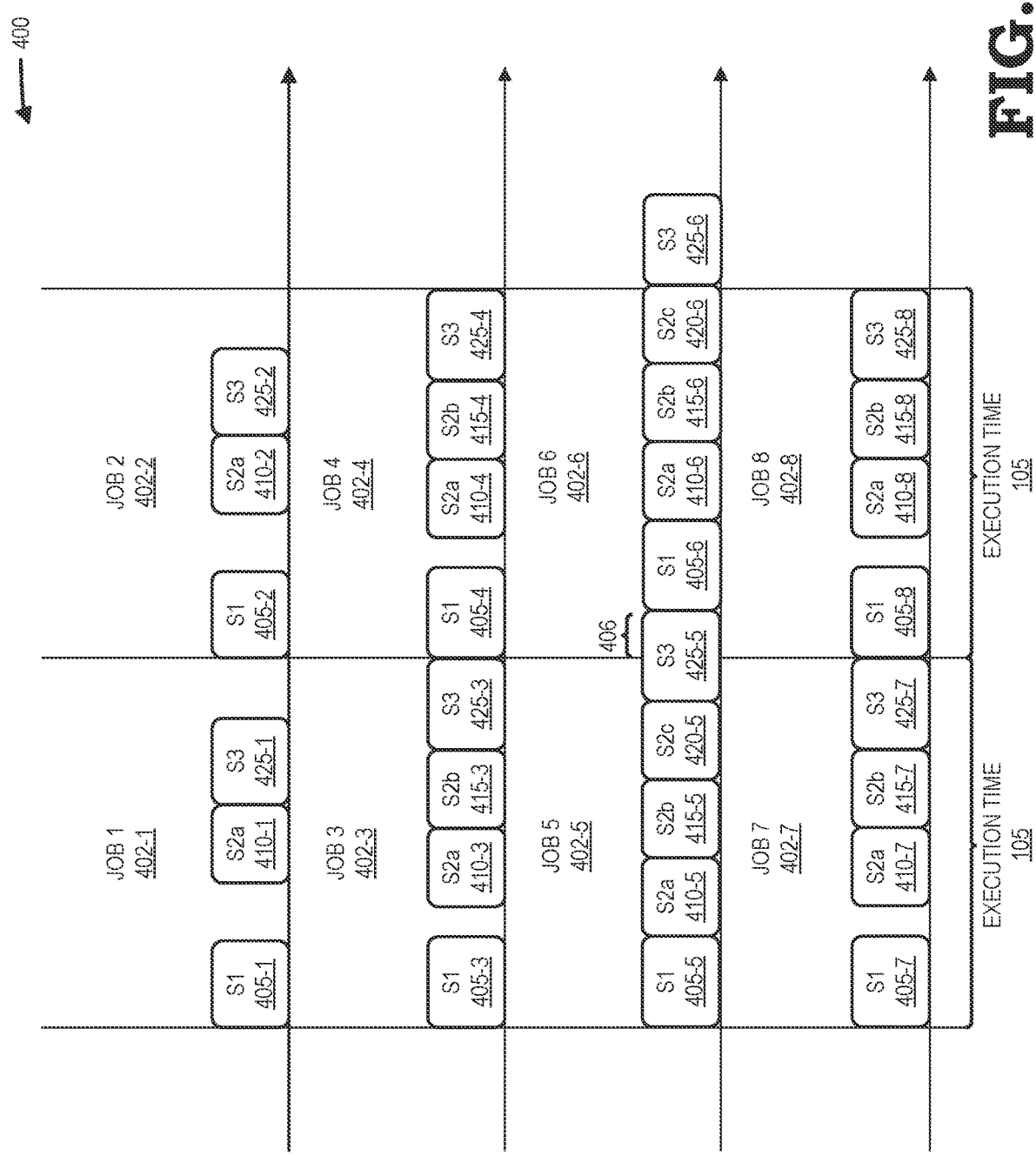
FIG. 4 is an example timing diagram for encoding jobs having multiple motion estimation sessions, in accordance with some embodiments.

Referring now to FIG. 4, an example timing diagram 400 for encoding jobs having multiple motion estimation sessions is presented, in accordance with some embodiments. For example, example timing diagram 400 presents the timings for eight encoding jobs 402 (402-1, 402-2, 402-3, 302-4, 402-5, 402-6, 402-7, 402-8) performed by encoder 120 (e.g., a hardware encoder) that each includes a captured frame session 235 (represented in FIG. 4 as sessions S1 405-1, 405-2, 405-3, 405-4, 405-5, 405-6, 405-7, 405-8, respectively), one or more motion estimation sessions 275 (represented in FIG. 4 as sessions S2a 410-1, 410-2, 410-3, 410-4, 410-5, 410-6, 410-7, 410-8, S2b 415-3, 415-4, 415-5, 415-6, 415-7, 415-8, and S2c 420-5, 420-6), and a rendered frame session 285 (represented in FIG. 4 as sessions S3 425-1, 425-2, 425-3, 425-4, 425-5, 425-6, 425-7, 425-8). Regarding job 1 402-1, encoder 120 is configured to perform job 1 402-1 based on a first set of motion estimation parameters 265 that indicate one motion estimation session 275 is to be performed. To this end, as demonstrated in timing diagram 400, job 1 402-1 includes a single motion estimation session 275 (e.g., S2a 410-1). Further, as demonstrated by example timing diagram 400, the amount of time for encoder 120 to perform job 1 402-1 (e.g., total performance time 115 of job 1 402-1) is less than the execution time 105 associated with encoder 120. Because the amount of time for encoder 120 to perform job 1 402-1 is less than the execution time 105 associated with encoder 120, timing diagram 300 indicates that there is unused bandwidth at encoder 120 when performing job 1 402-1. Based on this unused bandwidth, pre-processing circuitry 118 modifies one or more motion estimation parameters 265 of the set of motion estimation parameters 265 used to perform job 1 402-1 so as to increase the number of motion estimation sessions 275 performed for subsequent encoding jobs 402.

This modification of one or more motion estimation parameters 265 to produce a modified number of motion estimation sessions 275 to be performed is presented at job 3 402-3 in example timing diagram 300. For example, based on the modification to one or more motion estimation parameters 265, job 3 402-3 includes a first motion estimation session 275 (e.g., S2a 410-3) and a second motion estimation session 275 (e.g., S2b 41503). By increasing the number of motion estimation sessions 275 for job 3 402-3, the total time needed for encoder 120 to perform job 3 402-3 is increased, helping reduce the amount of unused bandwidth at encoder 120. Further, because, as demonstrated by example timing diagram 300, the time needed for encoder 120 to perform job 3 302-3 is less than the execution time 105, unused bandwidth at encoder 120 is again indicated. Based on this unused bandwidth, pre-processing circuitry 118 modifies one or more motion estimation parameters 265 of the set of motion estimation parameters 265 used to perform job 3 402-3 so as to increase the number of motion estimation sessions 275 performed for subsequent encoding jobs 402.

This second modification to increase the number of motion estimation sessions 275 to be performed is presented at job 5 402-5 in example timing diagram 400. For example, based on the modification to one or more motion estimation parameters 265 used to perform job 3 402-3, job 5 includes a first motion estimation session 275 (e.g., S2a 410-5), second motion estimation session 275 (e.g., S2b 415-5), and a third motion estimation session 275. However, as demonstrated by example timing diagram 400, the time needed for encoder 120 to perform job 5 402-5 is greater than the execution time 105, resulting in a delay 406 (e.g., delay time 125) before encoder 120 performs job 6 402-6. Based on this delay 406, pre-processing circuitry 118 modifies one or more motion estimation parameters 265 of the set of motion estimation parameters 265 used to perform job 5 402-5 so as to decrease the number of motion estimation sessions 275 performed for subsequent encoding jobs 402. This modification of motion estimation parameters 265 to decrease the number of motion estimation sessions 275 is demonstrated at job 7 402-7 of example timing diagram 400. For example, based on the modification to one or more motion estimation parameters 265 used to perform job 5 402-5, job 7 402-7 only includes a first motion estimation session 275 (e.g., S2a 410-7) and a second motion estimation session 275 (e.g., S2b 415-7). By decreasing the number of motion estimation sessions 275 for job 7 402-7, the total time needed for encoder 120 to perform job 3 402-3 is decreased, helping reduce or eliminate any delay 406 introduced by the performance of an encoding job 402.

Figure 5:
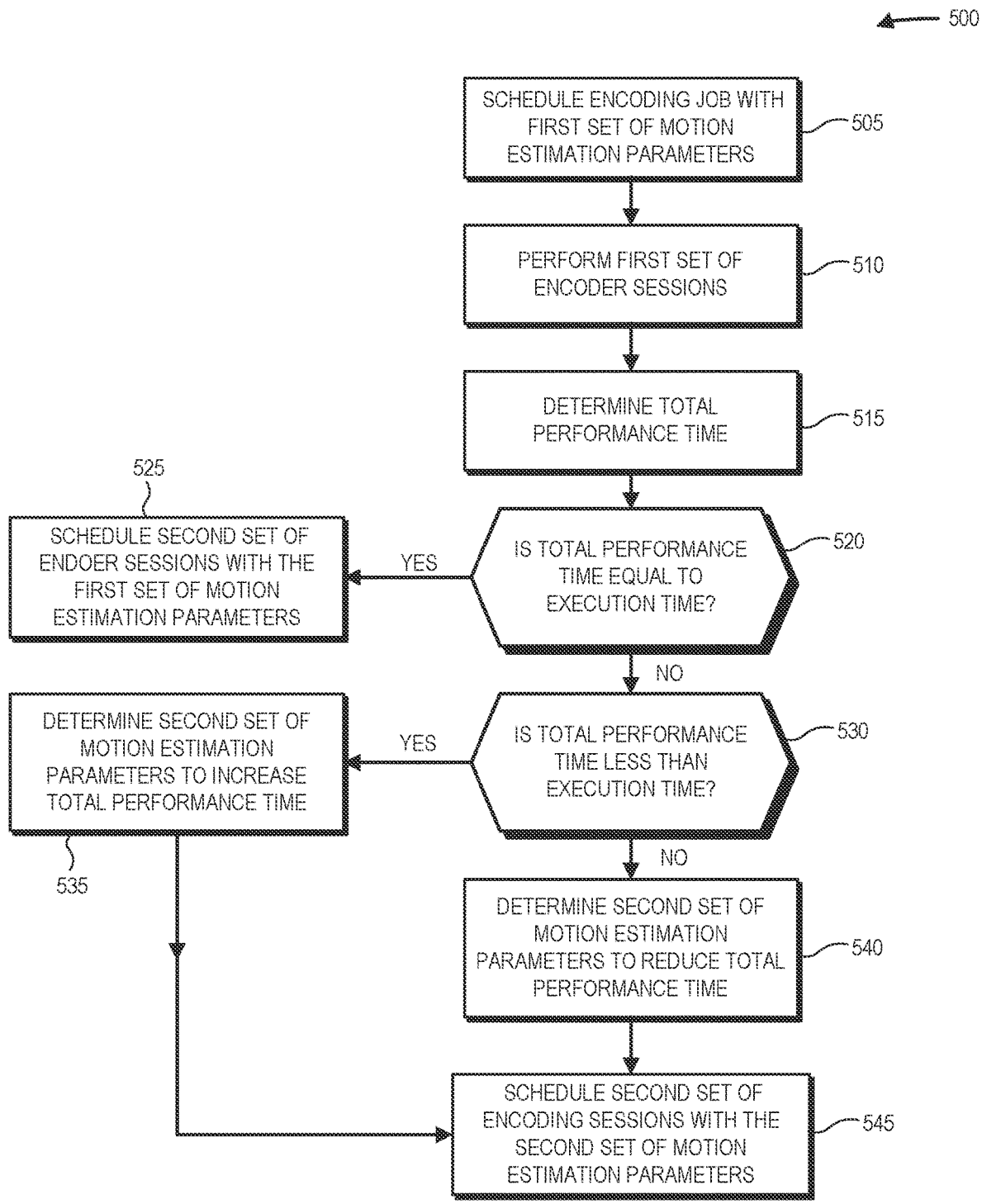
FIG. 5 is an example method for dynamically modifying motion estimation parameters for encoding jobs, in accordance with some embodiments.

Referring now to FIG. 5, an example method 500 for dynamically modifying motion estimation parameters for encoding jobs is presented. At block 505 of example method 500, processing system 100 is configured to schedule a first encoding job (e.g., encoding job 302, 402) using a first set of motion estimation parameters 265. That is to say, processing system 100 schedules a first set of encoder sessions (e.g., encoder job) for execution by encoder 120 such that encoder 120 performs the encoder sessions using the first set of motion estimation parameters 265. At block 510, encoder 120 receives data (e.g., instructions) indicating the first set of encoder sessions and the set of motion estimation parameters 265 from a buffer, queue, pre-processing circuitry 118, or any combination thereof. The first set of encoder sessions includes, for example, one or more captured frame sessions 235, motion estimation sessions 275 (e.g., as indicated by the first set of motion estimation parameters 265), and rendered frame sessions 285. After receiving the data indicating the first encoding job, encoder 120 performs the captured frame sessions 235, motion estimation sessions 275, and rendered frame sessions 285 included in the first set of encoder sessions based on the motion estimation parameters 265. As an example, after encoding a captured frame 205, encoder 120 determines one or more motion vectors 295 based on a rendered frame 215 and the first set of motion estimation parameters 265. After pre-processing circuitry 118 determines motion estimation data 225 based on the determined motion vectors 295, encoder 120 then encodes the rendered frame 215 based on the motion estimation data 225. In embodiments, while performing the first encoding job, encoder 120 is configured to increment one or more performance counters 135 for each clock cycle that elapses while encoder 120 performs the first encoding job.

At block 515, pre-processing circuitry 118 determines the total performance time 115 of the first encoding job. That is to say, pre-processing circuitry 118 determines the time (e.g., in clock cycles) it took encoder 120 to perform the first set of encoder sessions. To this end, pre-processing circuitry 118 is configured to check the performance counters 135 of encoder 120 and determine the total performance time 115 based on the performance counters 135. At block 520, pre-processing circuitry 118 determines whether the total performance time 115 of the first set of encoder sessions is equal to the execution time 105 associated with encoder 120. That is to say, pre-processing circuitry 118 determines whether the total performance time 115 is equal to a predetermined amount of time allocated to encoder 120 to perform the first set of encoder sessions. In response to the total performance time 115 of the first set of encoder sessions being equal to the execution time 105, Pre-processing circuitry 118 determines that the total performance time 115 indicates that no unused bandwidth or encoder delays were present at encoder 120 when encoder 120 performed the first set of encoder sessions. Based on no unused bandwidth or encoder delays being indicated by the total performance time 115 of the first set of encoder sessions, at block 525, Pre-processing circuitry 118 does not modify any motion estimation parameters 265 used to perform the first set of encoder sessions. Further, at block 525, the processing system 100 schedules a second set of encoder sessions (e.g., second encoding job) for performance by encoder 120 using the same set of motion estimation parameters 265 used during the performance of the first set of encoder sessions.

Referring again to block 520, in response to the total performance time 115 of the first set of encoder sessions not being equal to the execution time 105, pre-processing circuitry 118 determines that the total performance time 115 indicates that either unused bandwidth or an encoder delay was present at encoder 120 when encoder 120 performed the first set of encoder sessions. To this end, at block 530, pre-processing circuitry 118 determines whether the total performance time 115 of the first set of encoder sessions was less than the execution time 105 associated with encoder 120. In response to the total performance time 115 of the first set of encoder sessions being less than the execution time 105, pre-processing circuitry 118 determines that there was unused bandwidth at encoder 120 when the first set of encoder sessions was performed. After determining the total performance time 115 indicates that there was unused bandwidth at encoder 120, at block 535, pre-processing circuitry 118, for example, determines the amount of unused bandwidth that was at encoder 120 when the first set of encoder sessions was performed. For example, pre-processing circuitry 118 determines the amount of unused bandwidth based on a difference between the total performance time 115 and the execution time 105. Based on the amount of unused bandwidth, pre-processing circuitry 118 then modifies one or more motion estimation parameters 265 used during the first set of encoder sessions so as to increase the time needed for encoder 120 to perform one or more motion estimation sessions 275 of one or more subsequent sets of encoder sessions (e.g., encoding jobs). That is to say, pre-processing circuitry 118 modifies one or more motion estimation parameters 265 used during the first set of encoder sessions so as to produce a second set of motion estimation parameters 265 that increases the time needed for encoder 120 to perform one or more motion estimation sessions 275 of one or more subsequent sets of encoder sessions.

Referring again to block 530, in response to the total performance time 115 of the first set of encoding sessions not being less than (e.g., being greater than) the execution time 105, pre-processing circuitry 118 determines that there was an encoder delay at encoder 120 when the first set of encoder sessions was performed. After determining the total performance time 115 indicating that there was an encoding delay at encoder 120, at block 540, pre-processing circuitry 118, for example, determines the delay time 125 of the encoder delay caused by the performance of the first set of encoder sessions. For example, pre-processing circuitry 118 determines the delay time 125 based on a difference between the total performance time 115 and the execution time 105. Based on delay time 125, pre-processing circuitry 118 then modifies one or more motion estimation parameters 265 used during the first set of encoder sessions so as to decrease the time needed for encoder 120 to perform one or more motion estimation sessions 275 of one or more subsequent sets of encoder sessions. That is to say, pre-processing circuitry 118 modifies one or more motion estimation parameters 265 used during the first set of encoder sessions so as to produce a second set of motion estimation parameters 265 that decreases the time needed for encoder 120 to perform one or more motion estimation sessions 275 of one or more subsequent sets of encoder sessions. At block 545, the processing system 100 schedules a second set of encoder sessions for performance by encoder 120 using the second set of motion estimation parameters 265 determined at block 535 or block 540.

In some embodiments, the apparatus and techniques described above are implemented in a system including one or more integrated circuit (IC) devices (also referred to as integrated circuit packages or microchips), such as the processing unit described above with reference to FIGS. 1-5. Electronic design automation (EDA) and computer-aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer-readable storage medium accessible to the computing system. Likewise, the code representative of one or more phases of the design or fabrication of an IC device may be stored in and accessed from the same computer-readable storage medium or a different computer-readable storage medium.

A computer-readable storage medium may include any non-transitory storage medium, or combination of non-transitory storage media, accessible by a computer system during use to provide instructions and/or data to the computer system. Such storage media can include but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer-readable storage medium can include, for example, a magnetic or optical disk storage device, solid-state storage devices such as Flash memory, a cache, random access memory (RAM), or other non-volatile memory device or devices, and the like. The executable instructions stored on the non-transitory computer-readable storage medium may be in source code, assembly language code, object code, or another instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still, further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processing unit, comprising:
a hardware encoder configured to perform a first set of encoder sessions; and
a pre-processing circuitry configured to determine a set of motion estimation parameters based on an encoder delay associated with the first set of encoder sessions, wherein the hardware encoder performs a second set of encoder sessions based on the set of motion estimation parameters, the second set of encoder sessions including a first session to encode a captured frame of a set of captured frames, a second session to determine motion estimation data for a rendered frame of a set of rendered frames based on the set of motion estimation parameters, and a third session to encode the rendered frame based on the motion estimation data.

2. The processing unit of claim 1, wherein:
the hardware encoder is configured to perform the first set of encoder sessions based on a first set of motion estimation parameters,
the pre-processing circuitry is configured to modify the first set of motion estimation parameters based on the encoder delay associated with the first set of encoder sessions to produce the set of motion estimation parameters.

3. The processing unit of claim 2, wherein the pre-processing circuitry is configured to modify the first set of motion estimation parameters based on an amount of unused bandwidth at the hardware encoder during performance of the first set of encoder sessions.

4. The processing unit of claim 2, wherein the pre-processing circuitry is configured to modify the first set of motion estimation parameters based on a delay time of the encoder delay associated with the first set of encoder sessions.

5. The processing unit of claim 1, wherein the set of motion estimation parameters indicates a number of motion estimation sessions for the second set of encoder sessions.

6. A method comprising:
performing, at a hardware encoder, a first set of encoder sessions; determining a set of motion estimation parameters based on an encoder delay associated with the first set of encoder sessions; and
performing a second set of encoder sessions based on the set of motion estimation parameters, the second set of encoder sessions including a first session to encode a captured frame of a set of captured frames, a second session to determine motion estimation data for a rendered frame of a set of rendered frames based on the set of motion estimation parameters, and a third session to encode the rendered frame based on the motion estimation data.

7. The method of claim 6, further comprising:
modifying a first set of motion estimation parameters based on the encoder delay associated with the first set of encoder sessions to produce the set of motion estimation parameters, wherein the first set of encoder sessions is performed based on the first set of motion estimation parameters.

8. The method of claim 7, further comprising:
modifying the first set of motion estimation parameters based on a delay time of the encoder delay associated with the first set of encoder sessions.

9. The method of claim 6, wherein the motion estimation data includes a motion hint.

10. The method of claim 6, wherein the set of motion estimation parameters indicates a number of motion estimation sessions for the second set of encoder sessions.

11. The method of claim 6, wherein the set of motion estimation parameters indicates an input resolution.

12. A processing unit, comprising:
a hardware encoder configured to perform a first set of encoder sessions having a number of motion estimation sessions; and
a pre-processing circuitry configured to modify the number of motion estimation sessions based on an encoder delay associated with the first set of encoder sessions, wherein the hardware encoder performs a second set of encoder sessions having the modified number of motion estimation sessions, the first set of encoder sessions including a first session to encode a captured frame of a set of captured frames, a number of sessions to determine motion estimation data for a rendered frame of a set of rendered frames, and a second session to encode the rendered frame based on the motion estimation data.

13. The processing unit of claim 12, wherein:
the hardware encoder is configured to perform the first set of encoder sessions based on a set of motion estimation parameters,
the pre-processing circuitry is configured to modify the set of motion estimation parameters based on the encoder delay associated with the first set of encoder sessions.

14. The processing unit of claim 13, wherein the set of motion estimation parameters indicate a motion vector precision.

15. The processing unit of claim 1, wherein the pre-processing circuitry is configured to determine the encoder delay based on a comparison of a performance time of the first set of encoder sessions to a predetermined value.

16. The processing unit of claim 15, wherein the hardware encoder includes one or more counters indicating the performance time of the first set of encoder sessions.

17. The method of claim 6, further comprising:
determining the encoder delay based on a comparison of a performance time of the first set of encoder sessions to a predetermined value.

18. The method of claim 17, wherein the hardware encoder includes one or more counters indicating the performance time of the first set of encoder sessions.

19. The processing unit of claim 12, wherein the pre-processing circuitry is configured to determine the encoder delay based on a comparison of a performance time of the first set of encoder sessions to a predetermined value.

20. The processing unit of claim 19, wherein the hardware encoder includes one or more counters indicating the performance time of the first set of encoder sessions.

* * * * *